United States Patent
Bosworth et al.

(10) Patent No.: US 8,296,373 B2
(45) Date of Patent: Oct. 23, 2012

(54) AUTOMATICALLY MANAGING OBJECTIONABLE BEHAVIOR IN A WEB-BASED SOCIAL NETWORK

(75) Inventors: Andrew Bosworth, Palo Alto, CA (US); Scott Marlette, Palo Alto, CA (US); Chris Putnam, Palo Alto, CA (US); Akhil Wable, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 360 days.

(21) Appl. No.: 11/701,744

(22) Filed: Feb. 2, 2007

(65) Prior Publication Data

US 2008/0189380 A1    Aug. 7, 2008

(51) Int. Cl.
G06F 13/00    (2006.01)
H04N 7/167    (2011.01)

(52) U.S. Cl. .......................... 709/206; 709/224; 709/229

(58) Field of Classification Search .................. 709/204, 709/207
See application file for complete search history.

(56) References Cited

U.S. PATENT DOCUMENTS

| | | | |
|---|---|---|---|
| 5,937,413 A | 8/1999 | Hyun | |
| 6,029,141 A | 2/2000 | Bezos | |
| 7,013,292 B1 | 3/2006 | Hsu | |
| 7,249,123 B2 | 7/2007 | Elder | |
| 7,269,590 B2 | 9/2007 | Hull | |
| 2001/0037721 A1 | 11/2001 | Hasegawa | |
| 2002/0019739 A1* | 2/2002 | Juneau et al. | 705/1 |
| 2002/0046243 A1* | 4/2002 | Morris et al. | 709/204 |
| 2002/0059201 A1 | 5/2002 | Work | |
| 2003/0145093 A1 | 7/2003 | Oren | |
| 2003/0222918 A1 | 12/2003 | Coulthard | |
| 2003/0225632 A1 | 12/2003 | Tong | |
| 2004/0024846 A1 | 2/2004 | Randall | |
| 2004/0088177 A1 | 5/2004 | Travis | |
| 2004/0148275 A1 | 7/2004 | Achlioptas | |
| 2005/0021750 A1 | 1/2005 | Abrams | |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |
| 2005/0198020 A1 | 9/2005 | Garland | |

(Continued)

OTHER PUBLICATIONS

U.S. Appl. No. 11/639,655, Mark Zuckerberg, Systems and Methods for Social Mapping, filed Dec. 14, 2006.

(Continued)

Primary Examiner — Ian N Moore
Assistant Examiner — Thai Nguyen
(74) Attorney, Agent, or Firm — Fenwick & West LLP

(57) ABSTRACT

A system and method for curtailing objectionable behavior in a web-based social network is disclosed. The method includes monitoring various actions of users of a web-based social network for objectionable behavior. The monitored actions are those that affect other users of the social network. A policy is determined based on behaviors of users. The policy may be violated by a user if the user exceeds a policy threshold. Some monitored actions include the poking, friend requesting, and wall posting. A policy may be violated by multiple occurrences of a single type of action or by a combination of different types of actions. Upon a policy violation, a warning may be issued to the user or the user's account may be suspended.

23 Claims, 7 Drawing Sheets

U.S. PATENT DOCUMENTS

| | | |
|---|---|---|
| 2005/0198031 A1 | 9/2005 | Pezaris |
| 2005/0198305 A1 | 9/2005 | Pezaris |
| 2005/0203807 A1 | 9/2005 | Bezos |
| 2005/0216300 A1 | 9/2005 | Appelman |
| 2005/0216550 A1 | 9/2005 | Paseman |
| 2005/0235062 A1 | 10/2005 | Lunt |
| 2005/0256756 A1 | 11/2005 | Lam |
| 2006/0041543 A1 | 2/2006 | Achlioptas |
| 2006/0042483 A1 | 3/2006 | Work |
| 2006/0048059 A1 | 3/2006 | Etkin |
| 2006/0052091 A1 | 3/2006 | Onyon |
| 2006/0080613 A1 | 4/2006 | Savant |
| 2006/0085419 A1 | 4/2006 | Rosen |
| 2006/0136419 A1 | 6/2006 | Brydon |
| 2006/0143183 A1 | 6/2006 | Goldberg |
| 2006/0161599 A1 | 7/2006 | Rosen |
| 2006/0184617 A1 | 8/2006 | Nicholas |
| 2006/0190281 A1 | 8/2006 | Kott |
| 2006/0194186 A1 | 8/2006 | Nanda |
| 2006/0218225 A1 | 9/2006 | Hee Voon |
| 2006/0229063 A1 | 10/2006 | Koch |
| 2006/0230061 A1 | 10/2006 | Sample |
| 2006/0247940 A1 | 11/2006 | Zhu |
| 2006/0248573 A1 | 11/2006 | Pannu |
| 2006/0256008 A1 | 11/2006 | Rosenberg |
| 2006/0265227 A1 | 11/2006 | Sadamura |
| 2006/0293976 A1 | 12/2006 | Nam |
| 2007/0061405 A1* | 3/2007 | Keohane et al. ............... 709/207 |
| 2007/0099609 A1* | 5/2007 | Cai ................................ 455/428 |
| 2007/0174389 A1 | 7/2007 | Armstrong |
| 2007/0208916 A1 | 9/2007 | Tomita |
| 2007/0282987 A1 | 12/2007 | Fischer |
| 2008/0005076 A1 | 1/2008 | Payne |
| 2008/0010343 A1 | 1/2008 | Escaffi |
| 2008/0033776 A1 | 2/2008 | Marchese |
| 2008/0040428 A1 | 2/2008 | Wei |
| 2008/0059992 A1* | 3/2008 | Amidon et al. .................. 725/25 |
| 2008/0070697 A1 | 3/2008 | Robinson |
| 2008/0077581 A1* | 3/2008 | Drayer et al. ..................... 707/5 |
| 2008/0086458 A1 | 4/2008 | Robinson |

OTHER PUBLICATIONS

U.S. Appl. No. 11/646,206, Aaron Sittig, Systems and Methods for Generating a Social Timeline, filed Dec. 26, 2006.
U.S. Appl. No. 11/493,291, Mark Zuckerberg, Systems and Methods for Dynamically Generating a Privacy Summary, filed Jul. 25, 2006.
U.S. Appl. No. 11/701,698, Jed Stremel, System and Method for Digital File Distribution, filed Feb. 2, 2007.
U.S. Appl. No. 11/713,455, Jed Stremel, Systems and Methods for Automatically Locating Web-Based Social Network Members, filed Feb. 28, 2007.
U.S. Appl. No. 11/701,566, Jed Stremel, System and Method for Automatic Population of a Contact File with Contact Content and Expression Content, filed Feb. 2, 2007.
U.S. Appl. No. 11/502,757, Andrew Bosworth, Systems and Methods for Generating Dynamic Relationship-Based Content Personalized for Members of a Web-Based Social Network, filed Aug. 11, 2006.
U.S. Appl. No. 11/503,093, Andrew Bosworth, Systems and Methods for Measuring User Affinity in a Social Network Environment, filed Aug. 11, 2006.
U.S. Appl. No. 11/503,037, Mark Zuckerberg, Systems and Methods for Providing Dynamically Selected Media Content to a User of an Electronic Device in a Social Network Environment, filed Aug. 11, 2006.
U.S. Appl. No. 11/503,242, Mark Zuckerberg, System and Method for Dynamically Providing a News Feed About a User of a Social Network, filed Aug. 11, 2006.
U.S. Appl. No. 11/499,093, Mark Zuckerberg, Systems and Methods for Dynamically Generating Segmented Community Flyers, filed Aug. 2, 2006.
U.S. Appl. No. 11/580,210, Mark Zuckerberg, System and Method for Tagging Digital Media, filed Oct. 11, 2006.
U.S. Appl. No. 11/893,493, Arieh Steinberg, Web-Based Social Network Badges, filed Aug. 15, 2007.
U.S. Appl. No. 11/982,974, Ruchi Sanghvi, Systems and Methods for a Web-Based Social Networking Environment Integrated Within One or More Computing and/or Networking Applications, filed Nov. 5, 2007.
U.S. Appl. No. 11/701,595, Ezra Callahan, System and Method for Determining a Trust Level in a Social Network Environment, filed Feb. 2, 2007.
U.S. Appl. No. 11/726,962, Charlie Cheever, System and Method for Confirming an Association in a Web-Based Social Network, filed Mar. 23, 2007.
U.S. Appl. No. 11/796,184, Jared S. Morgenstern, System and Method for Giving Gifts and Displaying Assets in a Social Network Environment, filed Apr. 27, 2007.
U.S. Appl. No. 11/893,797, Yun-Fang Juan, System and Method for Invitation Targeting in a Web-Based Social Network, filed Aug. 16, 2007.
U.S. Appl. No. 11/893,820, Yun-Fang Juan, Systems and Methods for Keyword Selection in a Web-Based Social Network, filed Aug. 16, 2007.
U.S. Appl. No. 11/899,426, Jared Morgenstern, System and Method for Collectively Giving Gifts in a Social Network Environment, filed Sep. 5, 2007.
U.S. Appl. No. 12/072,003, Arieh Steinberg, Systems and Methods for Implementation of a Structured Query Language Interface in a Distributed Database Environment, filed Feb. 21, 2008.
U.S. Appl. No. 12/077,070, Dave Fetterman, Systems and Methods for Network Authentication, filed Mar. 13, 2008.
U.S. Appl. No. 12/154,504, Adam D'Angelo, Personalized Platform for Accessing Internet Applications, May 23, 2008.
U.S. Appl. No. 12/156,091, Mark Zuckerberg, Systems and Methods for Auction Based Polling, filed May 28, 2008.
U.S. Appl. No. 12/151,734, Jared Morgenstern, Systems and Methods for Classified Advertising in an Authenticated Web-Based Social Network, filed May 7, 2008.
U.S. Appl. No. 12/154,886, Nico Vera, Systems and Methods for Providing Privacy Settings for Applications Associated with a User Profile, filed May 27, 2008.
U.S. Appl. No. 60/965,624, Adam D'Angelo, Systems and Methods for Targeting Advertisements in a Social Network Environment, filed Aug. 20, 2007.
U.S. Appl. No. 11/893,559, Adam D'Angelo, Platform for Providing a Social Context to Software Applications, filed Aug. 15, 2007.
U.S. Appl. No. 60/967,842, Ezra Callahan, Systems and Methods for Dynamically Updating Privacy Settings, filed Sep. 7, 2007.
U.S. Appl. No. 60/966,442, Ezra Callahan, System and Method for Incorporating an Entity or Group other than a Natural Person into a Social Network, filed Aug. 28, 2007.
U.S. Appl. No. 60/965,852, Adam D'Angelo, Systems and Methods for Advertising, filed Aug. 22, 2007.
U.S. Appl. No. 61/005,614, Yishan Wong, Systems and Methods for Community Translations on a Web-Based Social Network, filed Dec. 5, 2007.
U.S. Appl. No. 12/080,808, Peter Deng, Systems and Methods for Calendaring, filed Apr. 2, 2008.
Flores, Fernando et al. "Computer systems and the design of organizational interaction." In ACM Transactions on Information Systems (TOIS), vol. 6, Issue 2, Apr. 1988.
Chipin. ChipIn: The easy way to collect money [online], Dec. 15, 2006 http://web.archive.org/web/20061215090739/www.chipin.com/overview.
Parzek, E Social Networking to ChipIn to a Good Cause [online]. Business Design Studio, Jun. 29, 2006 http://www.businessdesignstudio.com/resources/blogger/2006/06social-networking-tochipin-to-good.html.

* cited by examiner

AUTOMATICALLY MANAGING OBJECTIONABLE BEHAVIOR IN A WEB-BASED SOCIAL NETWORK

BACKGROUND OF THE INVENTION

1. Field of the Invention

The present invention relates generally to networks, and more particularly to social network activity.

2. Description of Related Art

One approach to curtailing objectionable behavior in a social network is to collect feedback from disgruntled users of the social network. A user may report abusive behavior to an operator of the social network after receiving unwelcome activity from other users of the social network. Unfortunately, this approach relies on user feedback which may be slow and sporadic. Some users may stop using the social network rather than being annoyed with unwelcome activity or having to submit complaints. Thus, relying on user feedback may tarnish some users' images of the social network.

Another approach to curtailing objectionable behavior in a social network is monitoring user traffic for potentially undesirable activity. A common monitoring approach focuses on pre-identified words and terms in e-mail addresses, titles, and body text. For example, to identify spam, pre-identified words may include "flowers," "loan," and "you have won." Unfortunately, some of these approaches are not useful tools to curtail objectionable behavior in a social network because they focus only on e-mail and not other peer-to-peer activity in a social network, such as requesting friends.

What is needed is an improved method for curtailing objectionable behavior in a web-based social network, including activities other than e-mail.

SUMMARY OF THE INVENTION

In one embodiment, the invention provides a method for curtailing objectionable behavior in a social network comprising receiving an action from a user of the social network, determining whether a policy threshold for that type of action is exceeded, and taking a corrective action. An action affects another user of the social network. A policy threshold is exceeded when the combination of the current action and prior actions by the same user exceeds a predetermined level of activity. The policy threshold may be time dependent. The corrective action is an action that is intended to prevent further action of the type determined to be objectionable.

The method of the invention may also be embodied in a program executable by a processor and recorded on a computer readable medium.

Another embodiment of the invention provides a system for curtailing objectionable behavior in a social network comprising a communication module, an accounts module, a policy module, and a violation module. The communication module is configured to receive from a user a current action that affects another user of the social network. The accounts module is configured to monitor and record the current action and associated time stamp information. The policy module is configured to store a policy threshold that may be time dependent. The violation module is configured to determine whether a combination of the current action and prior actions exceeds the policy threshold, and, if so, to take corrective action.

DETAILED DESCRIPTION OF THE INVENTION

The present invention provides systems and methods for curtailing objectionable actions by users of a web-based social network. Objectionable actions are those that adversely affect other users of the social network. A policy regarding the behaviors of users is determined and may be violated if the objectionable user conduct exceeds a threshold. The threshold may be exceeded by some number of multiple occurrences of a single type of action or some number of different types of actions within a particular time. Upon a policy violation, a warning may be issued to the user or the user's account may be suspended.

Some types of actions include "poking," "friend requesting," "wall posting," and "sending a message." A poke sends user identification to another user. The poke may be considered the social network equivalent of a nudge, i.e., a gesture to get someone's attention. Upon acceptance of a friend request, the requestor and requestee become friends. Friends may access more information about each other's profile than other non-friend users. A wall post allows the user to post a message to a friend's wall. The wall is a forum for comments or insights about another user. A message is a text message from one user to another. For further detail on actions, see U.S. patent application Ser. No. 11/701,595, "System and Method for Determining a Trust Level in a Social Network Environment."

Figure 1:
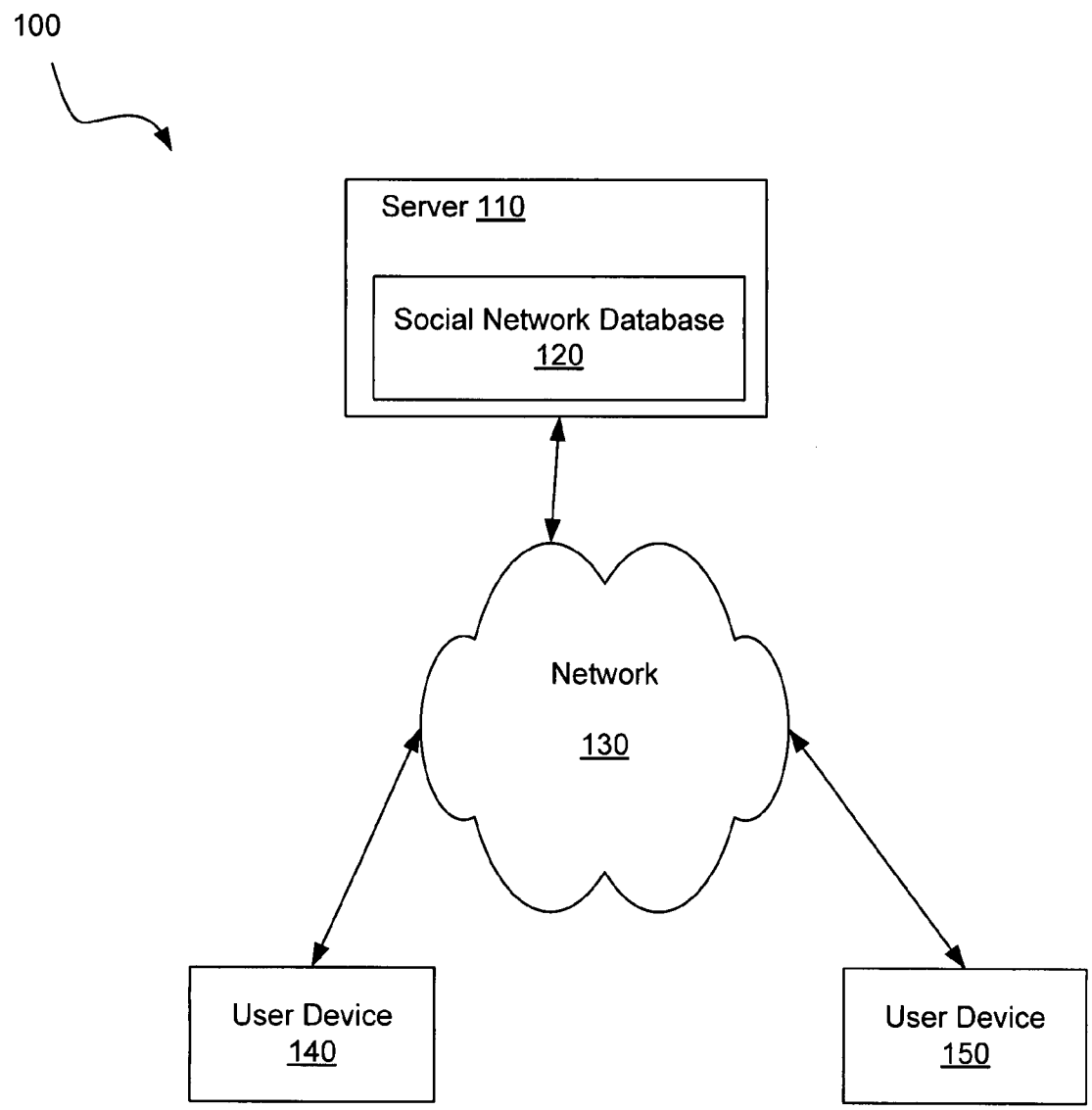
FIG. 1 illustrates an exemplary environment in which a social network may exist and in which objectionable conduct may occur.

FIG. 1 illustrates an exemplary environment 100 in which a social network may exist and in which objectionable conduct may occur. Environment 100 comprises a server 110, a network 130, and user devices 140 and 150. A social network database 120 is located on the server 110.

The server 110 monitors user activity and determines whether a predetermined policy is violated. The database 120 manages user information that is accessed by users of the social network. The server 110 and the database 120 are discussed further herein.

The network 130 provides the medium for communication between the server 110 and user devices 140 and 150. The network 130 may be the Internet, a wireless or wired network such as a mobile device carrier network, or any other network that can be used for communication between a server and a client.

In one embodiment, the user device 140 is used by a user initiating the actions being monitored by the server 110. The user device 150 is used by a recipient of the monitored actions. User devices 140 and 150 may each be a computer or a mobile device, such as a mobile phone, a cell-phone, a smart-phone, a personal digital assistant, a notebook computer, a laptop computer or a hand-held game console.

Figure 2:
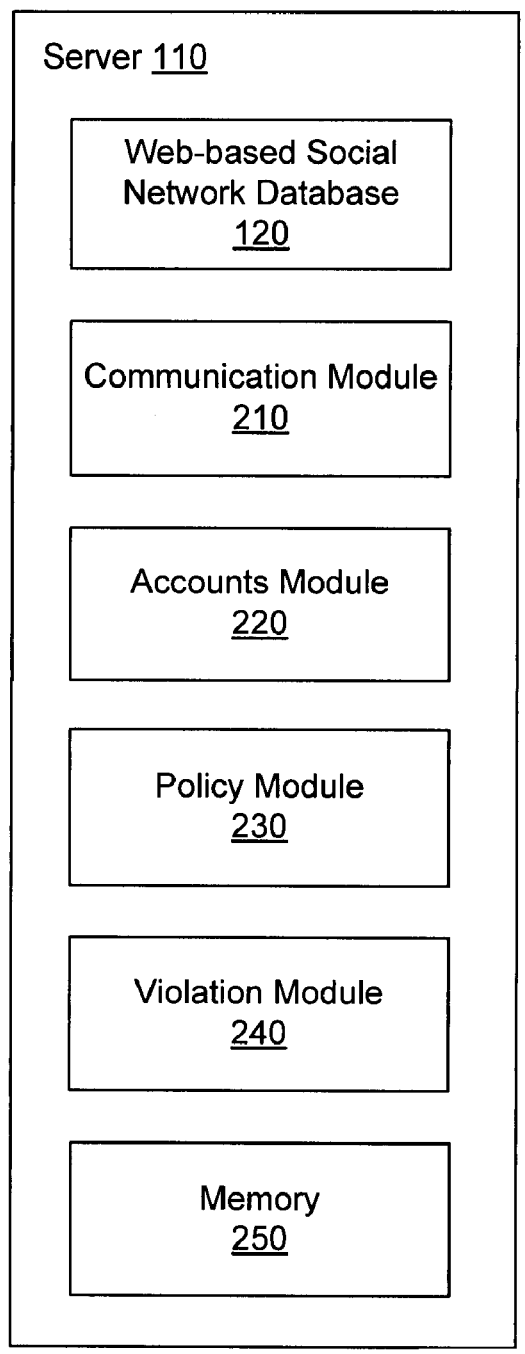
FIG. 2 illustrates one embodiment of the architecture of a server that may be used in a social network.

FIG. 2 illustrates one embodiment of the architecture of a server 110 that may be used in a social network. The server 110 comprises the database 120, a communication module 210, an accounts module 220, a policy module 230, a violation module 240, and memory 250.

The communication module 210 may be used to communicate with user devices 140 and 150. The accounts module 220 monitors and/or receives actions from user devices, such as user device 140. Actions from user device 140 that affect other user devices, such as user device 150, are time-stamped and the type of action is recorded in memory 250.

The policy module 230 stores one or more policies which determine whether a user's actions are objectionable. A policy may be represented by a type of action or a combination of actions and a time dependent function. Such functions may be linear, exponential, polynomial, or step functions, functions of acceleration, i.e., a function of time squared, or any other function that can be used to measure user activity over time. In various embodiments, a representative curve of the policy threshold has an initial steep slope that gradually decreases over time.

The policy may have different thresholds of violation for different degrees of the same type of action, e.g., a warning threshold which results in some warning to the offending user, and a suspension threshold which removes rights from the user. A suspension may be temporary, for example for hours, days, or months, or may require a system operator to reactivate a user's account prior to further actions. A suspension may help curtail spammers from abusing the social network. In various embodiments, the time of a temporary suspension is extended if a user attempts to repeat the type of action that resulted in suspension of the account.

The violation module 240 determines whether a user has violated the policy. The violation module 240 compares the number and type of actions recorded by the accounts module 220 with the policy stored in the policy module 230. Upon reaching a threshold, the violation module 240 may respond by requesting the communication module 210 to issue a warning to the user and/or by altering a user record in the database 120 to suspend the user's account.

The server 110 may include memory 250 to store applications or modules and other information. In some embodiments, applications, modules, and/or database 120 may reside in memory on several servers (not shown). These and other variations remain within the scope of the claimed invention.

Figure 3:
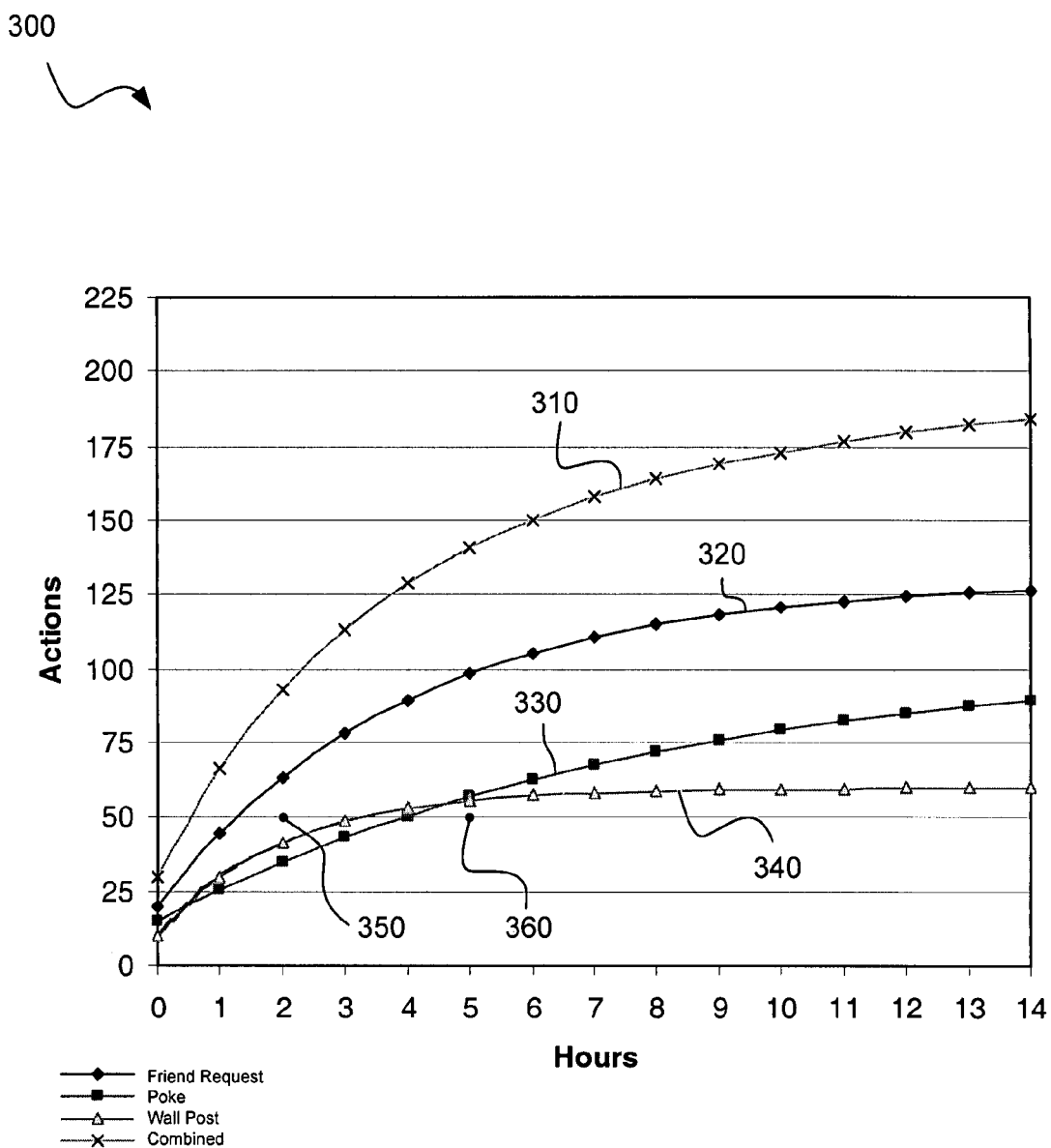
FIG. 3 shows an exemplary graph of policy thresholds of several action types in a social network according to one embodiment.

FIG. 3 shows an exemplary graph 300 of policy thresholds of several action types in a social network according to one embodiment. The graph 300 displays curves for a combined threshold 310, a friend request threshold 320, a poke threshold 330, wall post threshold 340, and user points 350 and 360, all over time.

The combined threshold 310 may represent a policy threshold for the combination of two or more types of actions. The friend request threshold 320, the poke threshold 330, and the wall post threshold 340 represent thresholds for friend requesting, poking, and wall posting, respectively. The combined threshold 310 is not necessarily always greater than the individual thresholds. For example, if the combined threshold 310 is a function of both the poke threshold 330 and the wall post threshold 340, the combined threshold 310 may be below the friend request threshold 320 for some or all periods.

Actions by a user exceeding the threshold may trigger the violation module 240 to take an action. For example, the point 360, which may represent fifty occurrences of an action in a five hour period, does not violate any of the policies as illustrated. However, the point 350, which represents fifty occurrences in a two hour period, violates the poke threshold 330 and the wall post threshold 340. Thus, if point 350 represents a user's actions of either poking or wall posting, then the policy is violated.

Figure 4:
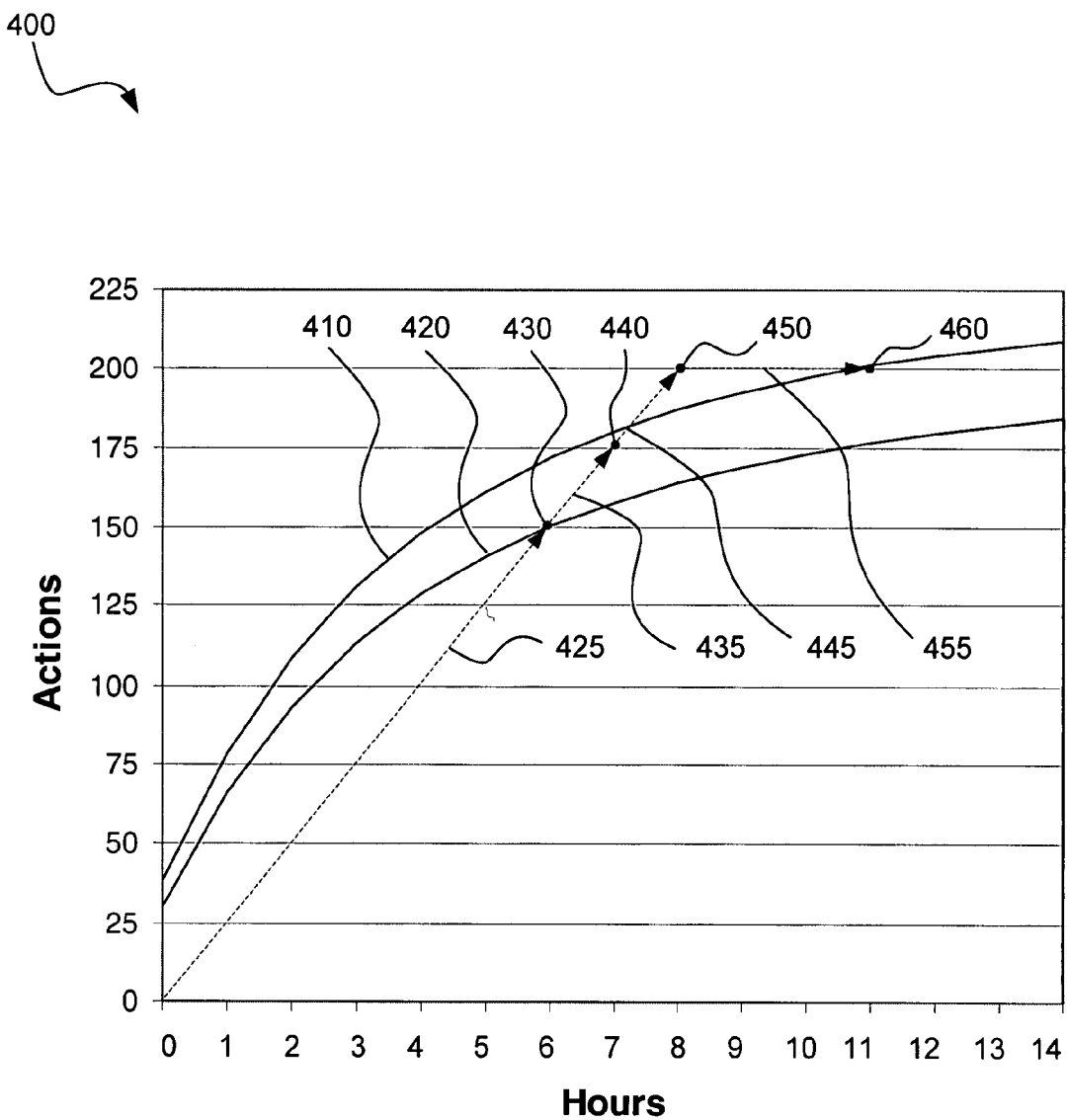
FIG. 4 shows an exemplary graph of policy thresholds of a single action type in a social network according to one embodiment.

FIG. 4 shows an exemplary graph 400 of policy thresholds of a single action type in a social network according to one embodiment. The graph 400 displays curves for a suspension threshold 410 and a warning threshold 420; points 430, 440, 450, and 460; and path segments 425, 435, 445, and 455.

The suspension threshold 410 and the warning threshold 420 both represent a single action type or a single combination of different action types, such as the combined action. Other curves may exist (not depicted) for other types of actions.

The point 430 represents 150 actions in a six hour period, which may be obtained at an average rate of 25 actions per hour for each of the six hours as indicated by the path segment 425. At the same rate for another hour, as indicated by path segment 435, the user will be at 175 actions represented by the point 440. In this event, the user's activity will be above the warning threshold 420, and the violation module 240 will request the communication module 210 to send a warning to the user. If the user continues at the same rate for another hour, as indicated by path segment 445, and reaches 200 actions, as represented by point 450, the user's account may be suspended for exceeding the suspension threshold 410.

In some embodiments, the user may need to wait for some period without further actions before the user again falls under the suspension threshold 410 and may make another action, here three hours, as indicated by path segment 455 and the point 460. In other embodiments, the suspension will be for a preset time period, e.g., six hours, two days, etc.

In some embodiments, the policy may have different thresholds for intra-group and inter-group activities. A group is a collection of users who are associated with the group. Thresholds may be higher for actions that affect other users within the same group than for actions that affect users outside the group. For example, five friends who are members of the same group may poke each other hundreds of times a day without exceeding a threshold, while the same conduct with non-group members may be deemed objectionable. This may promote intra-group activity.

As some groups may be more or less active than other groups, thresholds may be dependent on a group volume of activity to reflect an acceptable volume of activity for users associated with the group. For example, if Westside High School has a group of users who are on average five times more active than an average user of the social network, then users associated with the group may have higher thresholds than other users not associated with the group.

Figure 5:
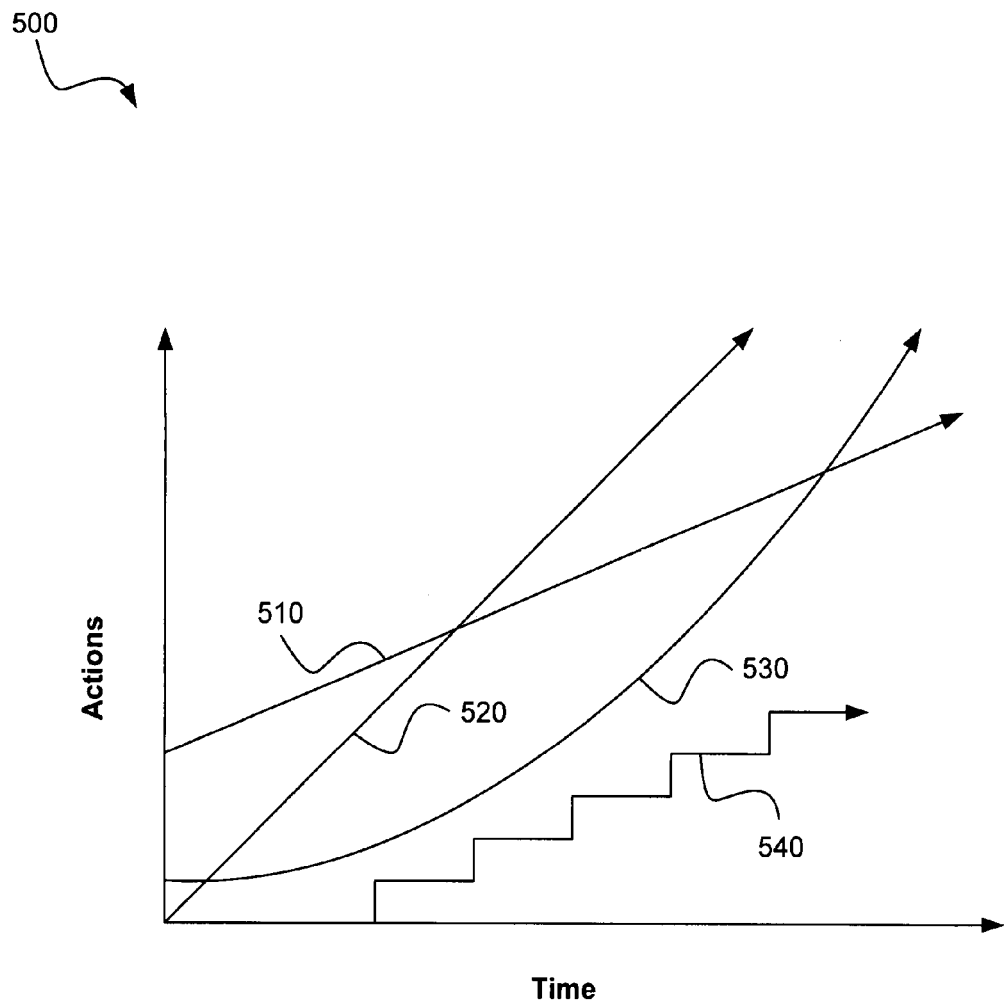
FIG. 5 shows an exemplary graph of different types of curves of policy thresholds in a social network according to one embodiment.

FIG. 5 shows an exemplary graph 500 of different types of curves of policy thresholds in a social network according to one embodiment. The graph 500 displays thresholds 510, 520, 530, and 540. The thresholds 510, 520, 530, and 540 may be warning threshold, suspension thresholds, or other thresholds.

At time zero, a threshold may have a positive rise as represented by thresholds 510 and 530. Alternatively, at time zero, a threshold may have a zero rise, e.g. at the origin, as represented by threshold 520. Some thresholds may require an elapse of time prior to having a positive rise, as represented by threshold 540.

The thresholds 510, 520, 530, and 540 are a function of time. Time units may be seconds, minutes, hours, weeks, days, years, centuries, or any other time unit.

A threshold may be linear, as represented by the thresholds 510 and 520, exponential, as represented by the threshold 530, a step function, as represented by the threshold 540, or any other function.

Figure 6:
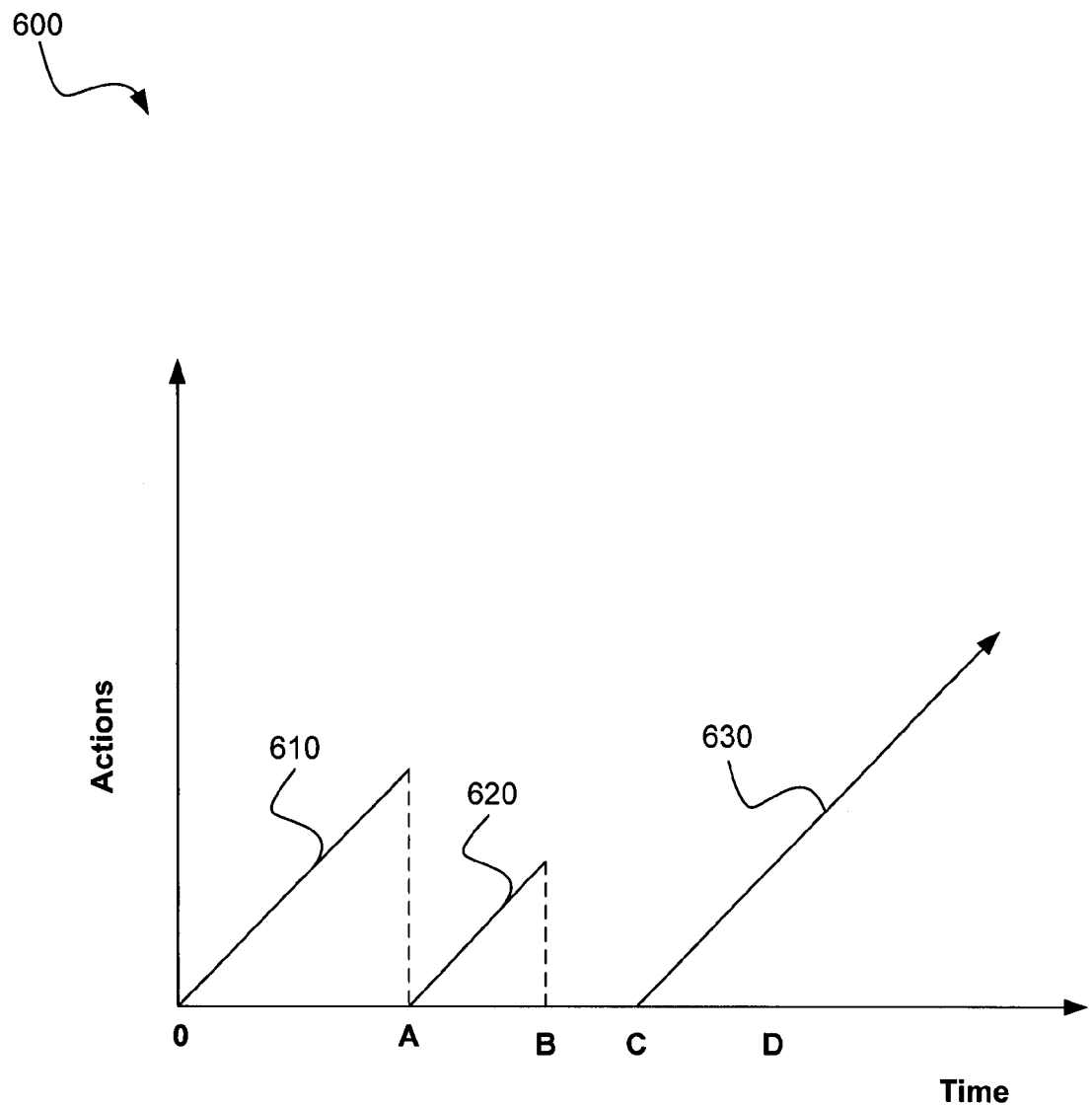
FIG. 6 shows an exemplary graph of resetting a time of a policy threshold in a social network according to one embodiment.

FIG. 6 shows an exemplary graph 600 of resetting a time of a policy threshold in a social network according to one embodiment. The graph 600 displays threshold segments 610, 620 and threshold 630.

A threshold may be reset periodically, e.g. hourly, daily, weekly, or yearly, as a result of an event, e.g. every time a user logs in, or manually by an operator. When a threshold is reset, the time and the action tally may be effectively reset to zero. For example, at time A the threshold is reset. Time A is now effectively at zero. The thresholds at time 0 and A are similar as indicated by threshold segments 610 and 620.

The threshold policy may adjust a time variable for logged-in time and logged-off time. For example, the threshold policy may accrue the logged-off time at half rate of the logged-in time, i.e., two hours of logged-off time is equivalent to one hour of logged-in time. In some embodiments, a logged-in and a logged-off time rates may vary depending on the hour of the day. For example, the time rates may be double normal during the day-light hours.

The threshold may accumulate time at a normal rate when a user is logged off. For example, at time D, a user logs off. Here, the threshold time is not reset and threshold 630 continues to increase.

While various embodiments have been described above, it should be understood that they have been presented by way of example only, and not limitation. For example, the threshold time may be reset without resetting the action tally or vice versa.

Figure 7:
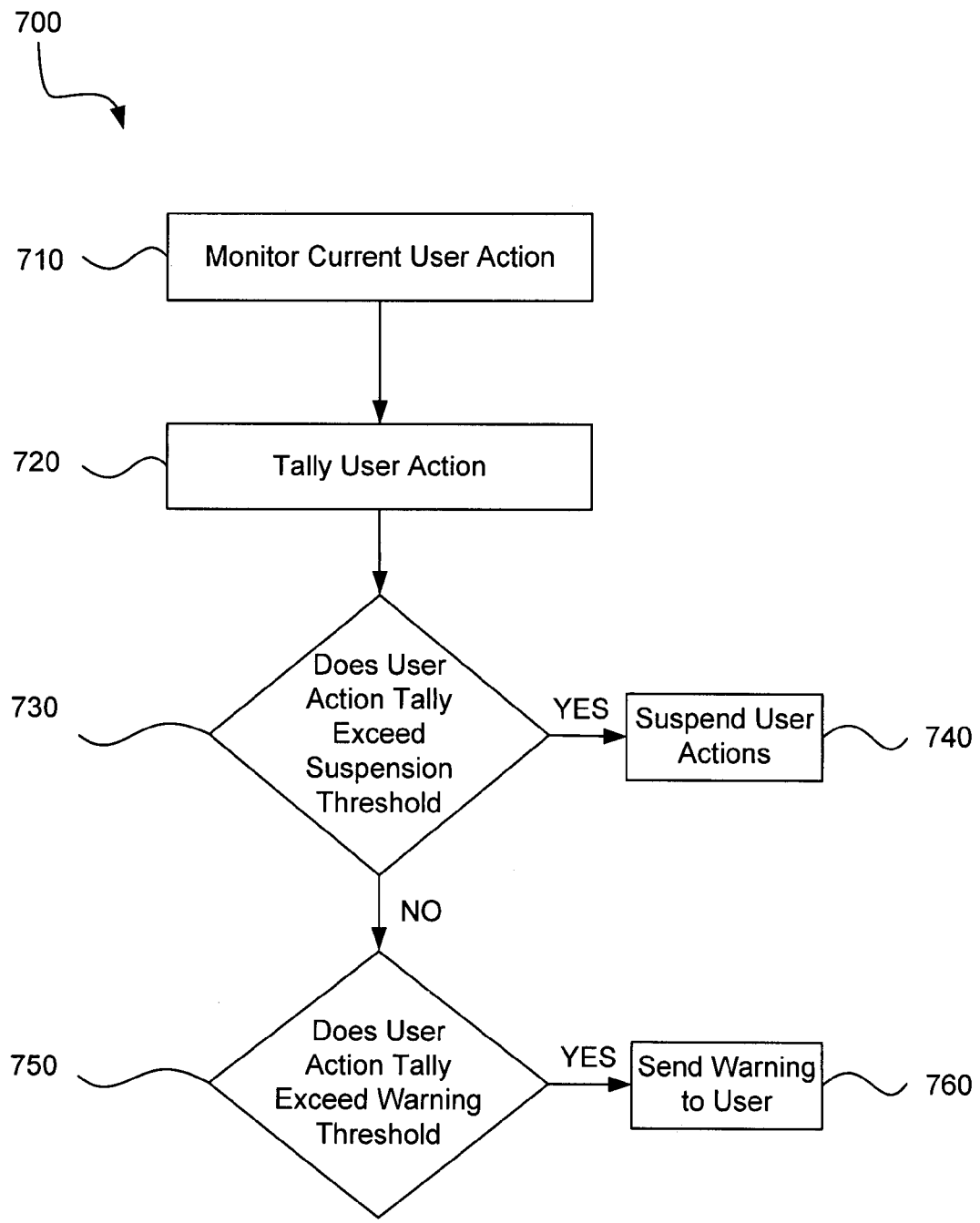
FIG. 7 is a flow chart of a method for curtailing objectionable behavior in a social network according to one embodiment.

FIG. 7 is a flow chart 700 of a method for curtailing objectionable behavior in a social network according to one embodiment. In step 710, a current action is monitored, e.g., by accounts module 220.

In step 720, the actions are tallied. One action may contribute to multiple tallies. For example, if a poke action is monitored, then the poke tally increases and a combined tally that includes the poke action increases. The time of the action is also noted.

In step 730, the violation module 240 compares the action tally with the policy stored in the policy module 230 to determine if the action tally exceeds a suspension threshold. If a suspension threshold is exceeded, then the action and/or account may be suspended at step 740.

In step 750, the violation module 240 again compares the action tally with the policy stored in the policy module 230 to determine if the action tally exceeds a warning threshold. If a warning threshold is exceeded, then a warning is sent to the user at step 760.

While various embodiments have been described above, it should be understood that they have been presented by way of example only, and not limitation. For example, the action may be any action that affects another user, such as a request for profile update. Thus, the breadth and scope of a preferred embodiment should not be limited by any of the above-described exemplary embodiments.

What is claimed is:

1. A method comprising:
  establishing a policy threshold for a plurality of different types of user actions performed in a social networking system, wherein the policy threshold comprises a first non-zero predetermined number of times that a user performs an action that affects one or more users within a specific group of users of the social networking system and a second non-zero predetermined number of times that the user performs an action that affects one or more users outside the specific group of users, and wherein the first predetermined number is greater than the second predetermined number;
  maintaining by the computer system, for a first user, a count for the number of times intra-group actions are performed and for the number of times inter-group actions are performed;
  receiving information about the first user of the social networking system performing an intra-group action or an inter-group action;
  determining by the computer system whether the count of user actions by the first user exceeds the policy threshold based at least in part on whether the action is an intra-group action or an inter-group action; and
  taking a corrective action responsive to the count exceeding the policy threshold.

2. The method of claim 1, wherein the intra-group actions and the inter-group actions comprise friend requests.

3. The method of claim 1, wherein the intra-group actions and the inter-group actions comprise wall postings.

4. The method of claim 1, wherein the intra-group actions and the inter-group actions comprise pokes.

5. The method of claim 1, wherein the corrective action is a warning sent to the first user to stop the objectionable behavior.

6. The method of claim 1, wherein the corrective action is a suspension of the right of the first user to take further action.

7. The method of claim 6, wherein the suspension of the right of the first user to take further action prevents the first user from further actions of the type of action that exceeded the policy threshold.

8. The method of claim 1, wherein the corrective action is a suspension of the first user's account.

9. The method of claim 1, wherein the policy threshold has different levels, each level having a corresponding corrective action.

10. The method of claim 9, wherein a first threshold is a suspension threshold and the action is suspending the first user's actions.

11. The method of claim 10, wherein a second threshold is a warning threshold and the action is a warning sent to the first user.

12. The method of claim 1, wherein the specific group of users of the social networking system comprises one or more users with whom the first user has established a connection in the social networking system.

13. The method of claim 1, wherein the intra-group actions comprise actions that initiate a communication with one or more users within the specific group of users, and wherein the inter-group actions comprise actions that initiate a communication with one or more users outside the specific group of users.

14. A non-transitory computer readable medium having embodied thereon a program, the program being executable by a computing device for performing a method comprising:
  establishing a policy threshold for a plurality of different types of user actions performed in a social networking system, wherein the policy threshold comprises a first non-zero predetermined number of times that a user performs an action that affects one or more users within a specific group of users of the social networking system and a second non-zero predetermined number of times that the user performs an action that affects one or more users outside the specific group of users, and wherein the first predetermined number is greater than the second predetermined number;

maintaining by the computer system, for a first user, a count for the number of times intra-group actions are performed and for the number of times inter-group actions are performed;

receiving information about the first user of the social networking system performing an intra-group action or an inter-group action;

determining by the computer system whether the count of user actions by the first user exceeds the policy threshold based at least in part on whether the action is an intra-group action or an inter-group action; and taking a corrective action responsive to the count exceeding the policy threshold.

15. The computer readable medium of claim 14, wherein the intra-group actions and the inter-group actions are friend requests.

16. The computer readable medium of claim 14, wherein the corrective action is a suspension of the right of the first user to take further action.

17. The non-transitory computer readable medium of claim 14, wherein the specific group of users of the social networking system comprises one or more users with whom the first user has established a connection in the social networking system.

18. The non-transitory computer readable medium of claim 14, wherein the intra-group actions comprise actions that initiate a communication with one or more users within the specific group of users, and wherein the inter-group actions comprise actions that initiate a communication with one or more users outside the specific group of users.

19. A system comprising:
   a communication module configured to receive information about a first user of a social networking system performing an intra-group action or an inter-group action that affects a second user of the social networking system, the intra-group action comprising an action that affects one or more users within a specific group of users of the social networking system and the inter-group action comprising an action that affects one or more users outside the specific group of users of the social networking system;

an accounts module configured to maintain for the first user a count for the number of times intra-group actions are performed and for the number of times inter-group actions are performed;

a policy module configured to establish a policy threshold for the plurality of different types of user actions performed in the social networking system, wherein the policy threshold comprises a first non-zero predetermined number of times that a user performs an action that affects one or more users within a specific group of users of the social networking system and a second non-zero predetermined number of times that the user performs an action that affects one or more users outside the specific group of, and wherein the first predetermined number is greater than the second predetermined number; and a violation module configured to determine whether the count of user actions by the first user exceeds the policy threshold based at least in part on whether the performed action is an intra-group action or an inter-group action, and to take corrective action responsive to the count exceeding the policy threshold.

20. The system of claim 19, wherein the intra-group actions and the inter-group actions are friend requests.

21. The system of claim 19, wherein the corrective action is a suspension of the right of the first user to take further action.

22. The system of claim 19, wherein the specific group of users of the social networking system comprises one or more users with whom the first user has established a connection in the social networking system.

23. The system of claim 19, wherein the intra-group actions comprise actions that initiate a communication with one or more users within the specific group of users, and wherein the inter-group actions comprise actions that initiate a communication with one or more users outside the specific group of users.

\* \* \* \* \*